United States Patent

Lu

[11] Patent Number: 6,062,523
[45] Date of Patent: May 16, 2000

[54] STRUCTURE OF A ROTATABLE BASE FOR COMPUTER MONITORS

[76] Inventor: William Lu, P.O. Box 82-144, Taipei, Taiwan

[21] Appl. No.: 09/238,604

[22] Filed: Jan. 28, 1999

[51] Int. Cl.[7] ............................. A47B 91/00; A47B 95/00
[52] U.S. Cl. ........................... 248/349; 248/921; 248/922
[58] Field of Search ................................ 248/349.1, 131, 248/415, 921, 922, 919

[56] References Cited

U.S. PATENT DOCUMENTS

| | | | |
|---|---|---|---|
| 4,473,206 | 9/1984 | Stillinger | 248/349.1 X |
| 4,919,387 | 4/1990 | Sampson | 248/921 X |
| 4,946,127 | 8/1990 | Kulaga | 248/415 X |
| 4,969,290 | 11/1990 | Skoretz | 248/349.1 X |
| 5,243,434 | 9/1993 | Nodama | 248/922 X |
| 5,775,665 | 7/1998 | Haskin | 248/349.1 X |

*Primary Examiner*—Ramon O. Ramirez
*Attorney, Agent, or Firm*—A & J

[57] ABSTRACT

A rotatable base for computer monitors includes a body portion having a top formed with a circular recess and a sectarian recess surrounding the circular recess and having same center as the circular recess, the sectorial recess being formed with a curved groove having same center as the sectorial recess; and a disc having a bottom provided with a curved lug configured to fit in the curved groove for limiting rotatable range of the disc with respect to the body portion, a plurality, a plurality of curved ribs having same center as the disc and adapted to slide on upper surface of the sectorial recess, and a plurality of legs arranged in a circular manner configured to fit in the circular recess, each of the legs having a lower end provided with a hook for preventing the disc from disengaging from the body portion inadvertently.

4 Claims, 2 Drawing Sheets

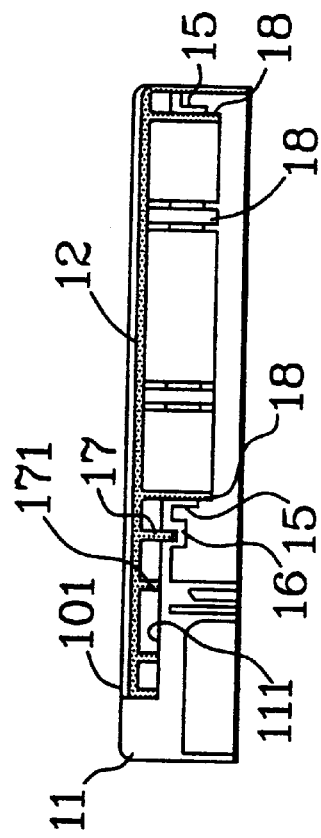
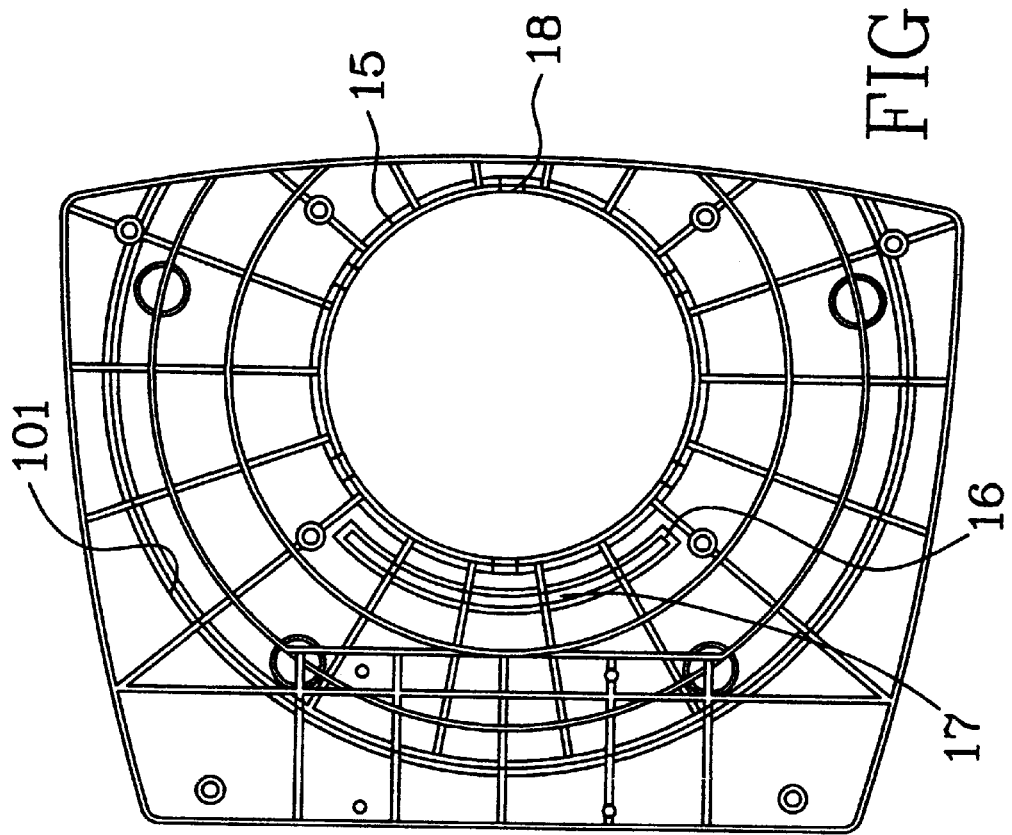
FIG. 4
FIG. 3

STRUCTURE OF A ROTATABLE BASE FOR COMPUTER MONITORS

BACKGROUND OF THE INVENTION

1. Field of the Invention

This invention is related to an improvement in the structure of a rotatable base for computer monitors.

2. Description of the Prior Art

Conventionally, the monitor is engaged with the base plate as follows: first, place the monitor on a flat, dry surface, with the face of the monitor resting face down, take the base plate and align the hooks on the top of the plate with the corresponding grooves on the bottom of the monitor, insert the hooks into the grooves, and once inserted completely, gently but firmly push down on the base plate until the large triangular hook pops up, locking the base into place, thereby making it difficult to assemble. In addition, with such structure, it is very difficult to rotate the monitor with respect to the base plate thus causing much inconvenience in use.

Therefore, it is an object of the present invention to provide an improvement in the structure of a rotatable base for a computer monitor which can obviate and mitigate the above-mentioned drawbacks.

SUMMARY OF THE INVENTION

This invention is related to an improvement in the structure of a rotatable base for computer monitors.

According to a preferred embodiment of the present invention, a rotatable base for computer monitors includes a body portion having a top formed with a circular recess and a sectarian recess surrounding the circular recess and having same center as the circular recess, the sectorial recess being formed with a curved groove having same center as the sectorial recess; and a disc having a bottom provided with a curved lug configured to fit in the curved groove for limiting rotatable range of the disc with respect to the body portion, a plurality, a plurality of curved ribs having same center as the disc and adapted to slide on upper surface of the sectorial recess, and a plurality of legs arranged in a circular manner configured to fit in the circular recess, each of the legs having a lower end provided with a hook for preventing the disc from disengaging from the body portion inadvertently.

It is the primary object of the present invention to provide a rotatable base for computer monitors which can be easily rotated as desired.

It is another object of the present invention to a rotatable base for computer monitors which can be rotated through an angle of 30 degrees in either direction as required.

It is still another object of the present invention to a rotatable base for computer monitors which will not knock down cups or the like in rotation.

It is still another object of the present invention to a rotatable base for computer monitors on which may be mounted a plurality of USB ports or the like.

It is further object of the present invention to a rotatable base for computer monitors which is easy to manufacture.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts. Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIG. 3 is a bottom plan view illustrating the structure of the present invention; and FIG. 4 is a sectional view of the present invention.

DETAILED DESCRIPTION OF THE PREFERRED EMBODIMENT

Figure 1:
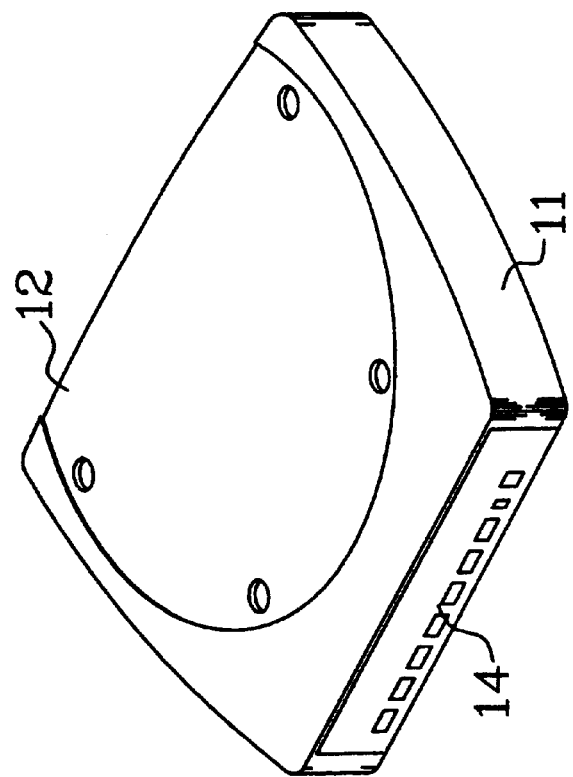
FIG. 1 is a front perspective view of the present invention.

For the purpose of promoting an understanding of the principles of the invention, reference will now be made to the embodiment illustrated in the drawings. Specific language will be used to describe same. It will nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 2:
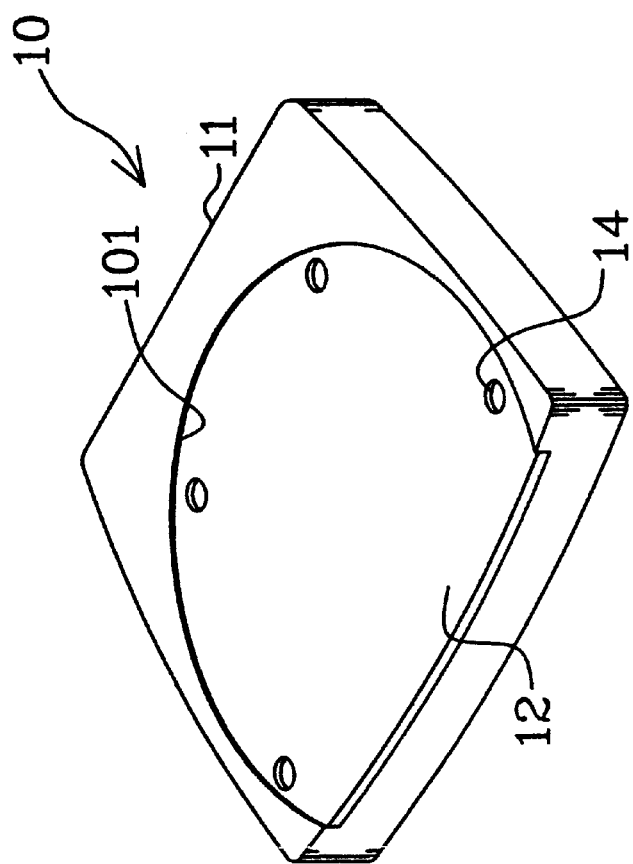
FIG. 2 is a rear perspective view of the present invention.

With reference to the drawings and in particular to FIGS. 1 and 2 thereof, the rotatable base 10 for computer monitors according to the present invention generally comprises a body portion 11 and a disc 12. The body portion 11 is formed at the top with a circular recess 15 (see FIGS. 3 and 4) and a sectorial recess 101 surrounding the circular recess 15 and having the same center as the circular recess 15. The sectorial recess 101 is formed with a curved groove 16 having the same center as the sectorial recess 101. The disc 12 is provided at the bottom with a curved lug 17 configured to fit in the curved groove 16 for limiting the rotatable range of the disc 12 with respect to the body portion 10, a plurality of curved ribs 171 having the same center as the disc 12 and adapted to slide on the surface 111 of the sectorial recess 101, and a plurality of legs 18 arranged in a circular manner configured to fit in the circular recess 15. Each of the legs 18 has a hook at the lower end for preventing the disc 12 from disengaging from the body portion 10 inadvertently. Accordingly, the disc 12 can be rotated with respect to the body portion 11.

The curved groove 16 preferably subtends an angle of 60 degrees with respect to the center of the circular recess 15 so that the disc 12 can be rotated through an angle of 30 degrees in either direction. In addition, the rear side of the body portion 11 may be provided with a plurality of USB ports 14 or the like.

Referring to FIGS. 1 and 2, the disc 12 has a plurality of holes 13 on its periphery so that a computer monitor (not shown) can be fixedly mounted thereon hence enabling the computer monitor to rotate in unison with the disc 12.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A rotatable base for computer monitors comprising:

a body portion having a top formed with a circular recess and a sectorial recess surrounding said circular recess and having same center as said circular recess, said sectorial recess being formed with a curved groove having same center as said sectorial recess; and a disc having a bottom provided with a curved lug configured to fit in said curved groove for limiting rotatable range of said disc with respect to said body portion, a plurality, a plurality of curved ribs having same center as said disc and adapted to slide on upper surface of said sectorial recess, and a plurality of legs arranged in a circular manner configured to fit in said circular recess, each of said legs having a lower end provided with a hook for preventing said disc from disengaging from said body portion inadvertently.

2. The rotatable base for computer monitors as claimed in claim 1, wherein said curved groove preferably subtends an angle of 60 degrees with respect to a center of said circular recess.

3. The rotatable base for computer monitors as claimed in claim 1, wherein said body portion has a rear side provided with a plurality of USB ports.

4. The rotatable base for computer monitors as claimed in claim 1, wherein said disc has a periphery formed with a plurality of holes.

* * * * *